United States Patent [19]
Seaman et al.

[11] 3,803,010

[45] Apr. 9, 1974

[54] PROCESS FOR IMPROVING HYDROGENATION CATALYST BY IRRADIATION

[75] Inventors: William Seaman, New York, N.Y.; David Stewart, Jr., Highland Park, N.J.

[73] Assignee: American Cyanamid Company, Stamford, Conn.

[22] Filed: Sept. 10, 1971

[21] Appl. No.: 179,511

[52] U.S. Cl............ 204/157.1 H, 252/438, 260/580
[51] Int. Cl................................................ B01j 1/10
[58] Field of Search ............. 204/157.1 H, 158 HE; 252/438

[56] References Cited
UNITED STATES PATENTS
3,189,561   6/1965   Graham...................... 204/157.1 H Primary Examiner—Howard S. Williams
Attorney, Agent, or Firm—John M. Miele

[57] ABSTRACT

A process for the preparation of a hydrogenation catalyst is provided which is useful in the reduction of aromatic nitro compounds to the corresponding aromatic amine compounds. More particularly, a process of preparation of a copper hydrogenation catalyst with improved catalytic activity produced by subjecting said catalytic material to high energy electron radiation until the dosage absorbed by the catalytic material is in the range of from about 0.5 megarad to about 5 megarads.

5 Claims, 2 Drawing Figures

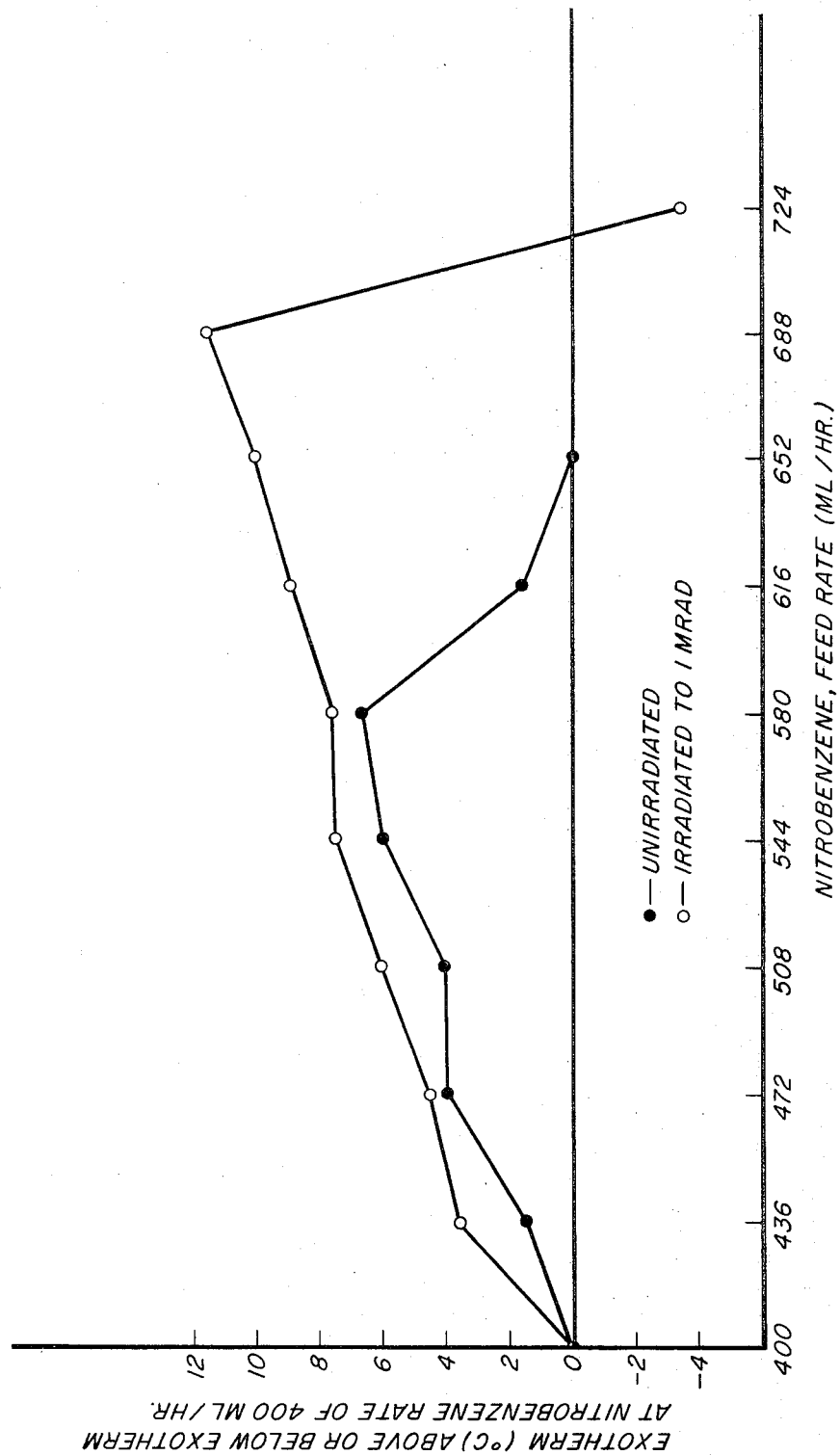

PROCESS FOR IMPROVING HYDROGENATION CATALYST BY IRRADIATION

BACKGROUND OF THE INVENTION

The catalytic reduction of nitro compounds to amino compounds and more specifically aromatic nitro compounds to aromatic amino compounds is an important chemical reaction. This reaction is of large commercial significance in the production of aniline from nitrobenzene.

In the past, numerous attempts have been made to prepare catalysts which would be useful in the reduction of nitro aromatic compounds to the corresponding amino compounds and which would have properties of sufficient activity and active catalytic life to make them suitable for commercial use. Various types of metallic catalysts have been investigated for this purpose. These include the use of fused copper oxide, gels of cupric chloride and sodium silicate, the deposition of metallic copper on alumina or the deposit of a copper salt on carriers such as pumice, asbestos or kieselguhr. Although success has been achieved in preparing metallic catalysts, especially copper catalysts which would effectively catalyze the reduction of nitro compounds to amines, these catalysts do not achieve the degree of efficiency to make this type of reaction commercially competitive.

The catalysts of the prior art have had several disadvantages for commercial utility. One of these is that the conversion of the nitro aromatic compound in the presence of hydrogen to the corresponding aromatic amino compound is not quantitative. Furthermore, the preparation of the catalysts requires many steps and exacting conditions thereby making such catalysts costly and commercially unattractive.

More recently, improved metallic catalysts have been described which have improved effectiveness in this type of reaction. These catalysts include, for example, a copper ammonium-silicate gel which is prepared by impregnating a hydrogel of silicic acid with a solution of cuprammonium compound followed by filtration, washing, drying and heating in a stream of hydrogen. Such catalysts are described in U.S. Pat. No. 2,891,094 to Karkalits et al. The catalysts as described in this patent have improved properties and are of commercial importance in contrast to various other metallic catalysts. Copper silicate gel catalysts, as described in the prior art, are not active enough to give an efficient commercial preparation of aromatic amine compounds from aromatic nitro compounds.

In the investigation for possible methods of improving metallic reduction catalysts, several studies have been made of the effects of irradiation with high-energy radiation such as electrons, gamma rays, X-rays, alpha rays and the like. However, the effect of a particular type and intensity of radiation on various types of catalysts have been found to be unpredictable and no broad generalization as to effects of such irradiation on the catalysts activity have been able to be made. It has been found that the catalytic activity of copper for hydrogenation of ethylene was markedly decreased by prior irradiation with alpha rays. Irradiation of zinc oxide catalytic material has a deleterious effect on its activity for hydrogenation of ethylene whereas it has an enhancing effect on the $H_2$-$D_2$ exchange. Furthermore, the irradiation of a cuprous oxide catalyst causes a decrease in its activity towards the oxygenation of carbon monoxide. In addition, the effect of irradiation upon a given catalyst may be altered when additional elements are presented as indicated by the fact that the activity of zinc oxide is markedly increased by irradiation whereas the activity of this same catalyst when treated with sodium, cadmium, aluminum or gallium ions undergoes essentially no enhancement when irradiated.

Thus, it may be seen from the prior art teachings, no conclusions can be drawn as to the degree of beneficial effect which would result from irradiation of catalytic material such as copper catalysts or copper silica gel catalysts.

A metallic catalyst, such as copper silica gel catalyst, is effective for reduction of aromatic nitro compounds to the corresponding amines, and has been used commercially for this purpose. Nevertheless, an increase in activity of the catalyst is always desirable to improve the economic aspects of the process. It has now been discovered that a highly active catalyst for the reduction of aromatic nitro compounds with hydrogen can be made by irradiation of a copper hydrogenation catalyst with high energy electron radiation so as to allow the catalyst to absorb a small amount of such radiation.

SUMMARY OF THE INVENTION

This invention relates to a process for the preparation of a hydrogen reduction catalyst for use in the reduction of aromatic nitro compounds to their corresponding aromatic amine compounds comprising exposing a copper hydrogenation catalyst to high energy electron or X-ray radiation until the dosage absorbed by the copper hydrogenation catalyst is in the range of from about 0.5 megarad to about 5 megarads.

DETAILED DESCRIPTION OF THE INVENTION

Figure 1:
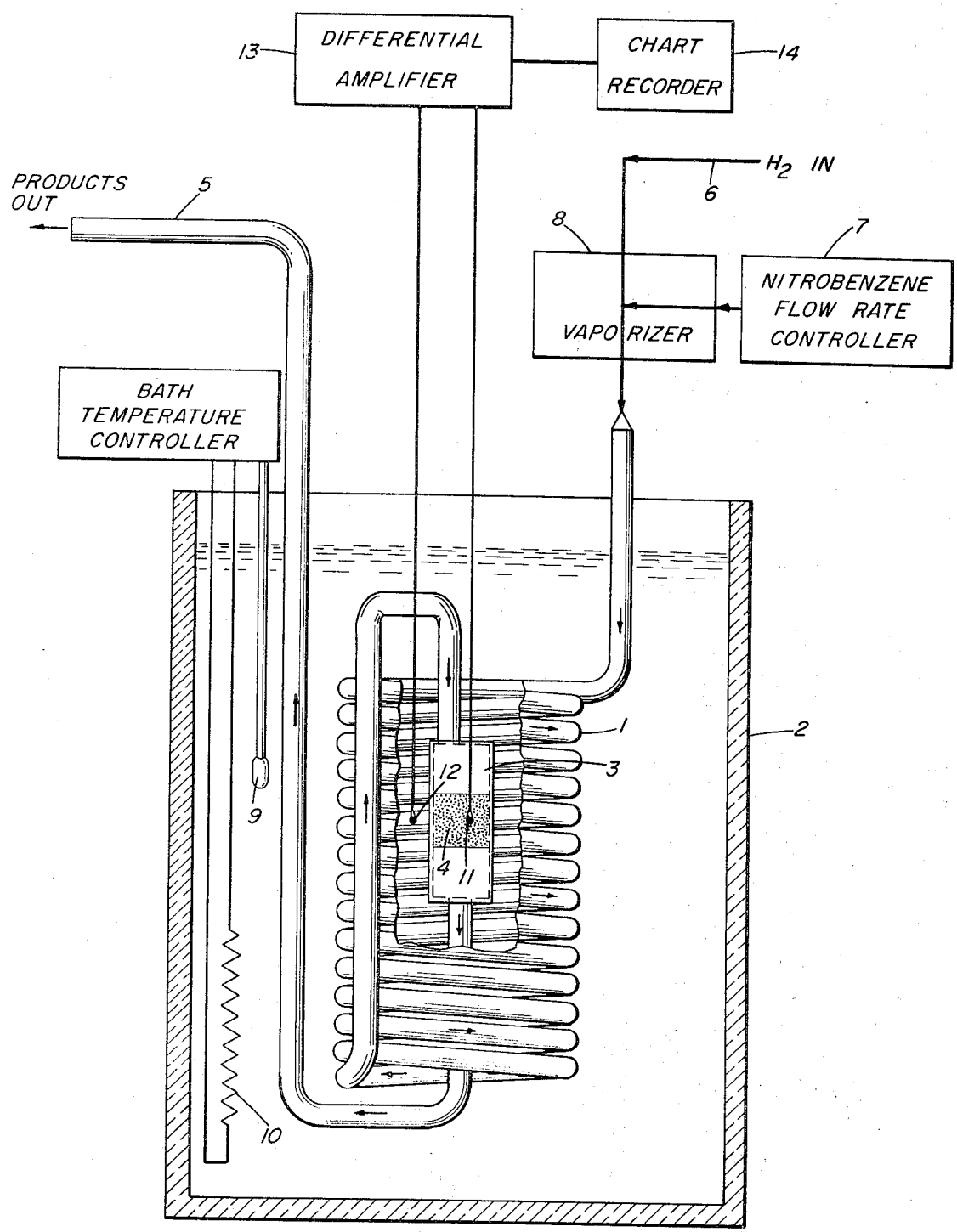

The present invention is based on the discovery that irradiation of a copper catalyst such as a copper silica gel catalyst enhances and greatly improves its activity for catalyzing hydrogenation of an aromatic nitro compound to the corresponding aromatic amino compound.

The process of the invention may be utlized on a variety of copper catalyst which have been found useful in the reduction of aromatic nitro compounds to aromatic amines such as in the reduction of nitrobenzene to aniline. The irradiation of copper catalysts, including copper-silica gel catalyst, has been found to greatly enhance their catalytic activities.

Copper reduction catalysts have been found to have increased catalytic activity when exposed to a high intensity radiation beam. The catalyst is exposed to the high intensity electron or X-ray beam to effect an absorbed dosage of from about 0.5 megarad to about 5 megarads. It has been found that this pretreatment of the catalytic material greatly improves its performance in catalyzing the reduction by hydrogen of a nitro aromatic compound to its corresponding amine compound. The irradiation can be conveniently accomplished by exposing a shallow layer of the catalyst material to a three million electron volt beam of a Van de Graaff electron accelerator for sufficient time to allow the catalytic material to absorb the preferred dosage.

It has been found that small amounts of absorbed radiation has a significant effect upon the activity of the catalyst. As stated hereinabove, a range of dosage of from about 0.5 megarad to about 5 megarads has been found beneficial. The preferred range of dosage is from about 0.5 megarad to about 3 megarads. Dosages above 5 megarads have been found to result in increasing deterioration of the catalytic material.

The improved properties of the catalyst affected by irradiation are retained by the catalyst for long periods of time even on storage at normal refrigeration and room termperature. However, some decrease in enhanced activities eventually does take place on such storage. Thus, for storage under conditions where retention of maximum activity is essential, and to make it possible to carry out the catalytic reaction after long periods of storage without any loss of improvement, it is convenient to store the catalyst in an environment of liquid nitrogen. The irradiated catalytic material may be placed immediately after the irradiation treatment in the liquid nitrogen, stored there, and withdrawn just before use.

Suitable irradiation to achieve the improvement of this invention involves exposing the catalytic material to ionizing radiation. The source of the radiation may be from any convenient known source such as from exposure to a three million electron volt beam of a Van de Graaff electron accelerator.

Various catalytic agents prepared from nonferrous metals, their salts or their oxides which have been adapted for use as a catalyst in the reduction reaction of nitro aromatic compounds by hydrogenation, have been found to have improved activity by subjecting them to radiation as described herein prior to their use as a catalytic material. The nonferrous metals, such as copper, are much milder in their catalytic action than other metallic catalysts and, therefore, are sometimes employed in order to obtain specific effects. As stated above, however, increase in activity of such a catalyst is generally desirable. It has now been found that subjecting these nonferrous catalytic materials to ionizing radiation produces a catalytic material having superior activity for use in reducing aromatic nitro compounds to their corresponding amines.

Nonferrous metal catalytic materials which are capable of having their activity enhanced by irradiation are described in the prior art. These include catalytic gels formed from copper ammonium compounds in sodium water glass solutions as described in U.S. Pat. No. 1,845,280 to A. O. Jaeger. Another group of nonferrous catalysts includes metal oxides on support medias such as asbestos, pumice or dispersed in a gel as described in U.S. Pat. No. 2,034,077 to H. R. Arnold et al. The catalyst may be a silica gel catalyst containing copper as described in U.S. Pat. No. 2,258,786 to R. M. Melavin et al. A copper-silicon alloy such as those described in U.S. Pat. No. 2,734,873 to L. R. Pittwell et al has been found to have enhanced catalytic activity in the reduction of nitro aromatic compounds to the corresponding amino compound by irradiation as described hereinabove. These catalysts, as well as other catalysts, especially copper catalysts, have been found useful for the catalytic reduction of aromatic nitro compounds to the corresponding amino compound. The irradiation of catalytic materials such as those described above, as well as other nonferrous reduction catalysts, especially copper reduction catalysts, may be used for the reduction of nitro compounds such as nitrobenzene with the formation of aniline giving greater yields and conversion than when the non-irradiated catalysts are used.

For evaluation of the activity of the various catalysts and a comparative study with non-irradiated catalysts, a method has been devised which conveniently may be used to follow the course of the reduction simply by observing the degree and course of generation of the exotherm resulting from the catalytic reduction. This makes it unnecessary to carry out a tedious isolation of the formed amino compound with each comparative study. Thus, simply by noting the increase of temperature, resulting, for example, from the catalytic reduction of nitrobenzene to aniline, as the rate of passage of nitrobenzene over the catalysts is increased, the activity and efficiency of the various catalysts may be determined.

The apparatus of FIG. I is used to determine the efficiency and activity of the various samples tested. The apparatus consists of a coil of tubing (1) which is submerged in a container (2) holding a liquid bath. The exit end of coil (1) leads into a glass reaction chamber (3) containing a charge of the catalyst (4) to be tested. The discharge outlet (5) leads outside the bath for discharge of the gases and collection of the products.

In operation, the catalyst sample is charged to the glass reaction chamber, the apparatus is assembled and hydrogen is passed into the coil and the reaction chamber through a hydrogen intake (6). After reduction of the copper compound in the catalyst to copper, nitrobenzene is introduced at the intake (7) and the liquid converted to the gaseous state in the vaporizer (8). The temperature of the bath which maintains the temperature of the coil and catalyst reaction chamber (3) is controlled by a thermostatic temperature controller activated through a thermometer (9) to supply heat through a heating coil (10).

The temperature within the catalyst bed in the reaction chamber is measured through a thermocouple (11) and the temperature in the bath within the coil adjacent to the reaction chamber is measured through another thermocouple (12). The voltage resulting from the temperature difference between these two thermocouples is amplified in the differential amplifier (13) and recorded on a chart recorder (14). The increase in exotherms at various feed rates over that at the standard feed rate for nitrobenzene is plotted versus nitrobenzene feedrates in °C. difference. From the plot, the increase in area above the standard feed-rate exotherm line is calculated in arbitrary area units, the magnitude of which serves as a measure of activity and improvement for the catalyst being treated.

EXAMPLE I

A copper catalyst is prepared by forming an aqueous solution containing 480 parts of copper nitrate. 1,500 cc. of 28% ammonium hydroxide is added with stirring. A precipitate first forms and is redissolved to form a deep blue solution. To this solution is added 100 parts of silica gel. The mixture is heated to 70°C., agitated until uniform and then sprayed dried to form a copper silica gel catalyst.

EXAMPLE II

Samples of the copper silica gel catalyst of Example I are irradiated by placing 0.5 gm. samples as a thin layer on 2 inch diameter trays and passing the trays under a previously calibrated 3 Mev beam of a Van de Graaff generator. The samples are exposed several times to the electron beam in order to give calculated dosages.

EXAMPLE III

Several samples of copper reduction catalyst as described in Example I are subjected to evaluation of activity utilizing the apparatus of FIG. I which is described hereinabove. The apparatus containing a catalyst sample is first flushed with nitrogen. Hydrogen is then introduced at 100 parts per minute into the coil while the bath is maintained at 225°C. and allowed to pass into the glass reaction chamber which is charged with 400 parts of catalyst. The hydrogen is passed through until the drop in an exotherm peak on the chart recorder indicates complete reduction of the copper. The bath temperature is reduced to 130°C. and the hydrogen flow to 20 parts per minute. The vaporizer temperature is raised to 250°C. and nitrobenzene is introduced at a controlled rate of 480 parts per hour. A reaction exotherm is produced and when this levels off, the bath temperature is raised 5°C.; when the reaction exotherm again levels off, the intermittent raising of the temperature in 5°C. stages is repeated continuously until an additional increase of 5°C. causes either a drop in the exotherm or a leveling off thereof.

The temperature of the bath is then decreased 5°C. and the rate of feed of nitrobenzene is increased in states, waiting each time for leveling off of the exotherm. After a greater or lesser increase in the rate of feed of the nitrobenzene, depending on the activity of the catalyst, the exotherm decreases in intensity and finally drops below the temperature differential which had been reached at a rate of feed of nitrobenzene of 480 parts per hour. When this drop occurs, the product changes from colorless, indicative of complete reduction of nitrobenzene to aniline, to yellow which is indicative of the presence of unreduced nitrobenzene.

The value of the exotherm in °C at a feed rate of 480 parts of nitrobenzene per hour is taken as zero. Increases above this are taken as a positive number of degrees and decreases below this are taken as a negative number of degrees. For each test, a curve is plotted with exotherm degrees above or below the zero point on the ordinate and feed rates on the abscissa. The increase in curve area above the zero exotherm line calculated in arbitrary area units for the irradiated samples is compared with the area for the corresponding unirradiated catalyst and serves as a measure of the improvement in activity of the irradiated catalyst being tested.

For exact control of the results, all comparisons of irradiated catalysts are made against an equal amount of a nonirradiated portion of the same sample differing only in the absence of the irradiation treatment. The irradiation is carried out according to Example II.

Table 1 shown below gives the data for several catalysts showing the measure of improvement of the catalyst resulting from irradiation; the dose of radiation being shown in megarads.

All the samples show increases in activity with irradiation to 5 megarad doses. Higher dosages yields inferior catalytic material.

EXAMPLE IV

Several samples of copper silicon gel catalyst as described in Example I are placed in 2 dram glass vials and irradiated under an X-ray beam produced by exposing a gold target to 3-Mev. electrons of a Van de Graaff accelerator. The spectrum of X-rays produced in this way ranges in energy from a maximum of 3 Mev. down to low energy.

Samples which are unirradiated as well as irradiated until absorption of 1 Megarad is accomplished, are taken from several batches of catalytic material. The untreated samples are compared with the treated samples in Table 2 below. All of the treated samples showed increased activity over their untreated counterpart.

TABLE 2

| Dose (Mrad) | II–A | II–B | II–C |
|---|---|---|---|
| | (Arbitrary Units) | | |
| 0 | 635 | 570 | 312 |
| 1 | 1395 | 1400 | 4000 |

EXAMPLE V

Several samples of copper-silica gel catalyst formed in a manner similar to Example I, are tested for activity and compared with irradiated samples prepared according to Example II. Table 3 below gives the activity areas calculated. The irradiated samples showed greater activity.

TABLE 3

| | Activity Area in Arbitrary Units | | |
|---|---|---|---|
| Dose (Mrad) | 4–A | 4–B | 4–C |
| 0 | 0 | 0 | 33,560 |
| 1 | — | — | 233,000 |
| 2 | 360 | 400 | 41,920 |
| 3 | 1,000 | 800 | 40,340 |

What is claimed:

1. A process for the preparation of a catalyst for the reduction of aromatic nitro compounds with hydrogen to the corresponding aromatic amine compounds which comprises exposing a copper hydrogenation catalyst with high energy electron radiation until the dosage absorbed by said copper hydrogenation catalyst is from about 0.5 megarad to about 3 megarads.

2. A process according to claim 1 wherein the high energy radiation comprises electrons of 3 million electron volts energy.

TABLE 1

| Dose of 3-Mev. Electrons (Megarads) | Curve Area in Arbitrary Units | | | | | |
|---|---|---|---|---|---|---|
| | 1–A | 1–B | 1–C | 1–D | 1–E | 1–F |
| 0 | 640 | 2350 | 190 | 2500 | 126 | 472 |
| 1 | 1510 | 5881 | 1748 | 8088 | 525 | 1713 |
| 5 | 1810 | 2410 | 365 | | | |

3. A process according to claim 1 wherein the high energy radiation is X-radiation.

4. A process according to claim 1 wherein the high energy radiation is gamma radiation.

5. A process according to claim 1 wherein the copper hydrogenation catalyst consists essentially of copper ammonium nitrate on a silica gel.

* * * * *